UNITED STATES PATENT OFFICE.

HIRAM O. BROWN, OF CASTLETON, VERMONT.

IMPROVEMENT IN PRODUCING SLATE-PENCILS.

Specification forming part of Letters Patent No. 129,096, dated July 16, 1872.

*To all whom it may concern:*

Be it known that I, HIRAM O. BROWN, of Castleton, State of Vermont, have invented and produced a new and Improved Mode of Producing Slate-Pencils; and I do hereby declare that the following is a description thereof, which will enable others skilled in the art to make and use the same.

The invention relates to the forming the slate-pencils from a composition compounded and operated with in the following manner: The composition I use has for its principal ingredients finely-powdered slate, or other equivalent argilliferous substance, and silicate of soda, with or without a small per cent. of carbonate of potash or albumen, according to the degree of hardness, toughness, and finish desired. I first reduce to a very fine powder any suitable argilliferous material, such as shale in any of its varieties. This powder is then bolted and introduced into any suitable dough-trough or mixing-machine, when it is thoroughly mixed with silicate of soda of commerce in quantity sufficient to give to the mass a consistency about equal to potter's clay when ready for molding. This mass is then thoroughly kneaded, and then formed into sheets or slabs of proper dimensions by rolling or pressing, or both. These sheets or slabs are then subjected to the action of a pair of rollers having grooves to correspond with the intended form of the pencil to be made; or to a roller operating with a sliding bed, each having proper corresponding grooves; or to the action of molding-dies; or, again, the sheets or slabs before mentioned may be partially or wholly dried, and then subjected to the action of suitable cutting or scraping formers, any of which mechanical formative operations would produce the pencils from the sheet or slab.

To give to these composition pencils several grades of hardness, to adapt them, respectively, to the materials which they may be intended to mark, I use in some cases with the above composition carbonate of potash in quantity of about one part to fifteen parts of the powdered material, more or less, according to the degree of hardness desired; and in some cases, where it is desirable to make the pencil tougher and susceptible of polish, I use albumen dissolved in hot water, with a greater or less degree of strength, as may be desired for the class or grade of pencils to be made.

By using the powdered slate and the silicate of soda in manner above described only, and also the said composition with a more or less quantity of carbonate of potash or albumen, as above described, I am enabled to produce from the said principal compositions pencils having several grades of hardness and finish, each of which will be perfectly adapted to a particular purpose in their use, as is found in the several grades of lead-pencils.

After the pencils have been formed in the manner above described, I dry them preferably in a vacuum at a low temperature, using with the vacuum sulphuric acid, quicklime, or other material having a great affinity for moisture, which will cause the drying to be speedily effected without warping the pencils; though the pencils may be dried in open air and at a moderate temperature.

The pencils thus made from the above composition, either with or without the grading or toughening ingredients, will not in their several grades present any scratching particles to the surface being marked, but will have a uniformity of texture and hardness in each of the several grades, for use on natural or artificial slate, black-board, or iron.

Having described my invention, what I claim, and desire to secure by Letters Patent, is—

1. The improved composition for slate-pencils, compounded of the ingredients herein described, and mixed and compounded in the proportions substantially as set forth, for the purpose specified.

2. In the manufacture of slate-pencils, the reducing the plastic composition above described to a sheet or slab form preliminary to the final shaping of the pencils, substantially as and for the purpose set forth.

3. In the manufacture of slate-pencils, subjecting the composition, when in a sheet or slab form, herein described, to the mechanical formative operations set forth, substantially as and for the purpose specified.

HIRAM O. BROWN.

Witnesses:
  GEO. A. THOMPSON,
  CHAS. J. SELKIRK.